United States Patent
Lloyd et al.

(10) Patent No.: US 6,542,109 B2
(45) Date of Patent: Apr. 1, 2003

(54) AUTONOMOUS OFF-BOARD DEFENSIVE AIDS SYSTEM

(75) Inventors: Peter Gregory Lloyd, Salisbury (GB); Philip Edward Galloway, Romsey (GB); Thomas Welsh, Hedge End Southhampton (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 09/827,324

(22) Filed: Apr. 6, 2001

(65) Prior Publication Data

US 2002/0145554 A1 Oct. 10, 2002

(51) Int. Cl.$^7$ .............................. G01S 7/36; G01S 7/42; H04K 3/00
(52) U.S. Cl. ................................ 342/14; 342/13; 367/1
(58) Field of Search .................. 342/13–20; 367/1; 250/493.1–503.1

(56) References Cited

U.S. PATENT DOCUMENTS

| | | | | |
|---|---|---|---|---|
| 2,953,377 A | * | 9/1960 | Brust | 273/105.3 |
| 3,016,532 A | * | 1/1962 | Del Mar | 343/18 |
| 4,149,166 A | * | 4/1979 | Null | 343/18 |
| 4,184,209 A | * | 1/1980 | Crist | 367/1 |
| 4,231,311 A | * | 11/1980 | Longerich | 114/244 |
| 4,233,605 A | * | 11/1980 | Coleman | 343/18 |
| 4,366,962 A | * | 1/1983 | Campbell et al. | 273/360 |
| 4,808,999 A | * | 2/1989 | Toman | 342/15 |
| 5,144,587 A | | 9/1992 | Mason | 367/1 |
| 5,260,820 A | | 11/1993 | Bull et al. | 359/145 |
| 5,268,875 A | * | 12/1993 | Charlton | 367/1 |
| 5,398,032 A | * | 3/1995 | Tucker et al. | 342/9 |
| 5,786,786 A | * | 7/1998 | Small | 342/13 |

FOREIGN PATENT DOCUMENTS

| | | |
|---|---|---|
| DE | 44 23 235 | 4/1996 |
| EP | 0 905 527 A1 | 7/1998 |
| GB | 2 303 755 A | 2/1997 |
| GB | 2 342 983 A | 4/2000 |

OTHER PUBLICATIONS

"Radar detection of hidden targets", MacDonald, D.; Isenman, J.; Roman, J., Aerospace and Electronics Conference, NAECON 1997, Proceedings of the IEEE 1997 National, pp.: 846–855 vol. 2.*

British Search Report under Section 17 dated Nov. 24, 2000.

* cited by examiner

Primary Examiner—Thomas H. Tarcza
Assistant Examiner—Brian Andrea
(74) Attorney, Agent, or Firm—Crowell & Moring LLP

(57) ABSTRACT

There is provided an autonomous off-board defensive aids system (100) for use with a host craft (102), for example, with combat aircraft or submarines. More particularly, the host craft (102) deploys a plurality of controllable off-board units (104, 106) to counter an offensive threat or to engage in autonomous offensive actions. The controllable off-board units (104, 106) implement active stealth facilities: each off-board unit (104, 106) having a receiver unit for detecting impinging detection pulses, for example radar or sonar pulses, and a transmitter unit for generating an artificial detection pulse profile, for example "spoofing" or masking the presence of the host craft. The controllable off-board units are of two types: tethered (104) and free moving (106). The off-board units (104, 106) can have conventional propulsion apparatus, for instance, propellers, rockets or jets. Off-board units (104, 106) each have control apparatus which allows the off-board units (104, 106) to co-operate. General commands are conveyed to the control apparatus by control cabling provided in the tether cable (108).

31 Claims, 3 Drawing Sheets

AUTONOMOUS OFF-BOARD DEFENSIVE AIDS SYSTEM

BACKGROUND OF THE INVENTION

The present invention relates to an autonomous off-board defensive aids system.

More particularly, the system consists of an apparatus provided on a host craft that deploys a plurality of off-board units for countering an offensive threat, for implementing a sensor array or for engaging in autonomous offensive actions. The host craft can be, for example, a combat aircraft, ship or a submarine.

It is know to protect host craft using an unmanned and unpowered, of-board decoy unit. The decoy unit is towed by the host craft and draws offensive threats away from the host craft. For example, a combat aircraft can carry a decoy unit to confuse anti-aircraft missiles and a battle-ship or a submarine can use a decoy unit to evade torpedoes. In each case, the decoy unit can be sacrificed to preserve the host craft.

The decoy unit can draw away offensive threats by active stealth. Both the decoy unit and the host craft have active stealth sensors and transmitters, which co-operate in a sensor array and a transmitter array respectively. Airborne active stealth techniques include jamming of transmissions, radar detection signals in particular, and electronic warfare support measures (ESM), where a source of a given transmission can be located and a false radar profile can be generated for the source. When the aircraft senses, though the sensor array, the presence of radar wavefronts, the active stealth transmitter array can generate either a matching anti-phase wavefront, to disperse the impinging wavefront and maintain low observability, or a "spoof" wavefront, whereby the radar reflections will appear to indicate a different aircraft, for instance an aircraft that the enemy radar regards as friendly. In the analogous case of active stealth in submarines, false sonar and magnetic field profiles are created and enemy detection systems are jammed.

Active stealth, in particular ESM, relies upon accurate synchronization between active stealth transmitters that generate wavefronts and accurate knowledge of the position of said active stealth transmitters—a failure of either of these features can result in the active stealth being compromised.

A single, unpowered and uncontrolled decoy unit can only provide a limited degree of active stealth: the required accuracy of synchronization and positioning are absent. Towing more than one unpowered and uncontrolled decoy unit can be problematic, since without control, the decoy units can become entangled.

SUMMARY OF THE INVENTION

It is an object of the invention to obviate or at least mitigate the above problems.

Ideally, provision is made for a plurality of controllable off-board units with active stealth capabilities.

In accordance with the present invention there is provided, a deployable off-board defensive aids system for implementing active stealth facilities with respect to a host craft, the system including a plurality of controllable off-board units associated with the host craft, wherein each controllable off-board unit includes means for co-operation with at least the host craft. Throughout the following description, the term 'off-board' denotes 'external to the host craft'.

Advantageously, each controllable off-board unit includes means for co-operation with at least one other controllable off-board unit.

The plurality of controllable off-board units preferably includes at least one tethered controllable off-board unit, which has a tether cable.

Each tethered controllable off-board unit is ideally arranged to be capable of rapid release from the tether cable.

Advantageously, each tethered controllable off-board unit is arranged to be capable of deployment and recovery using the tether cable.

Preferably, the tether cable includes power cabling.

Equally, the tether cable can include command cabling.

A given tethered controllable off-board unit can advantageously be attached by the tether cable to a tether node that is, in turn, attached to the host craft by a further tether cable.

Preferably, the further tether cable includes both command cabling and power cabling.

It is preferable that the tether node can route commands carried by the command cabling from the given tethered controllable off-board unit to at least one other tethered controllable off-board units and to the host craft.

The tether node is advantageously provided on a tethered controllable off-board unit that is attached in turn to the host craft by a further tether cable.

Alternatively, each tethered controllable off-board unit can be attached directly to the host craft by the tether cable.

Advantageously, each controllable off-board unit includes a power source for supplying power to the controllable off-board unit.

The power source may be a battery.

It is preferable that each controllable off-board unit includes a short-range communications unit and each controllable off-board unit can thereby communicate directly with at least the host craft.

Furthermore, each controllable off-board unit can use the short-range communications unit to communicate directly with at least one other controllable off-board unit.

Each controllable off-board unit preferably has a movement control system, which autonomously controls maneuvers of said controllable off-board unit.

The movement control system ideally includes control surfaces and an actuator system, which actuates the control surfaces according to instructions from a processing means.

Advantageously, each controllable off-board unit has a means of propulsion.

The means of propulsion can be: a propeller engine, a rocket engine or a jet engine.

The host craft is optionally a combat aircraft.

When used with combat aircraft, the external surface of each controllable off-board unit is advantageously arranged both to be aerodynamic and to have low radar observability.

Furthermore, the active stealth facilities implemented preferably relate to radar.

For airborne applications, it is preferred that the system is further arranged to provide a three dimensional radar sensor capability with spherical coverage, by integrating radar sensor apparatus into the controllable off-board units.

Alternatively, the host craft is a submarine.

In the case of submarine applications, the external surface of each controllable off-board unit is advantageously arranged both to be hydrodynamic and to have low sonar observability.

Preferably, the active stealth facilities implemented relate to sonar.

The active stealth facilities implemented in the deployable off-board defensive aids system advantageously include electronic warfare support measures.

Preferably, the active stealth facilities implemented also include jamming.

It is preferable that each controllable off-board unit has an active stealth transmitter device and an active stealth receiver device; the active stealth receiver device detects impinging detection pulses and the active stealth transmitter device transmits an artificial profile.

The destruction of unmanned units is preferred over the destruction of a combat craft and thus the unit preferably uses low cost components. The electronic components of the plurality of controllable off-board units are thus preferably commercial off-the-shelf components.

Other objects, advantages and novel features of the present invention will become apparent from the following detailed description of the invention when considered in conjunction with the accompanying drawings.

DETAIL DESCRIPTION OF THE INVENTION

Figure 1:
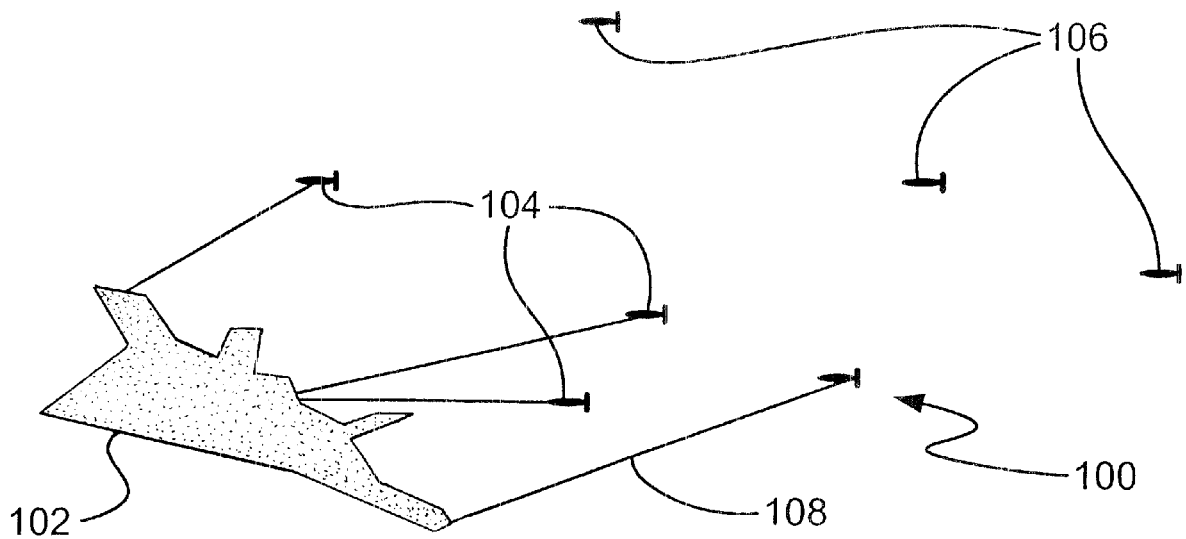
FIG. 1 shows an embodiment of the deployable off-board defensive aids system of the present invention when provided for a combat aircraft.

In one embodiment of the present invention, there is provided a deployable off-board defensive aids system having a plurality of controllable off-board units. Referring to FIG. 1, the deployable off-board defensive aids system 100 is implemented in a host combat aircraft 102 having a first group of tethered controllable off-board units 104 in tow and a second group of free flying controllable off-board units 106. Both groups of controllable off-board unit are used to counter a threat or to perform an offensive mission in their own right. Each controllable off-board unit, whether tethered 104 or free 106, includes means for providing automatic and semi-autonomous flight control to allow flight without entanglement with other controllable off-board units.

The controllable off-board units 104, 106 maneuver in concert with respect to the aircraft 102 and co-operate to provide the aircraft 102 with active stealth facilities. An important feature of the control of tethered off-board units 104 is that aerodynamic forces must be held in balance to maintain safe flight resulting in a degree of symmetry in the formations used by the controllable off-board units 104.

Generally, the controllable off-board units 104, 106 are stored within a pod attached to the host aircraft or within an interior bay of the host aircraft until they are deployed. The tethered controllable off-board units 104 are capable of being deployed and recovered as required, there being apparatus for letting out and drawing in the tether cable 108. The tethered controllable off-board units 104 can also be rapidly released from the tether cable 108, enabling them to move away from the aircraft whilst diverting an offensive threat. The remaining tethered controllable off-board units 104 must be able to compensate for the change in force distribution when an off-board unit becomes detached.

The active stealth facilities are used to baffle radar detection. Each of the plurality of controllable off-board units is positioned relative to the host aircraft, each off-board unit has radar sensors and transmitters and each off-board unit can produce a radar profile. Due to their controllable nature the off-board units can perform close formation maneuvers. The radar profile of the collection of off-board units and the host craft can be co-ordinated to imitate a formation of many aircraft or an aircraft of a different type.

Whether the tether cable 108 is present or not, a given controllable off-board unit 104,106 can be provided with a propulsion mechanism as known from other unmanned aircraft, for example propellers, rockets and jet engines, thereby becoming capable of autonomous flight. Likewise, a controllable off-board unit 104,106 can carry a battery for powering equipment belonging to the off-board unit. However, a tethered controllable off-board unit 104 can be provided with power directly from the host craft along a power cable. The tether cable 108 can include the power cable, indeed a tether cable of sufficient flexibility, strength and conductivity can be used as a power cable. The tether cable 108 can also include a command cable.

Figure 2:
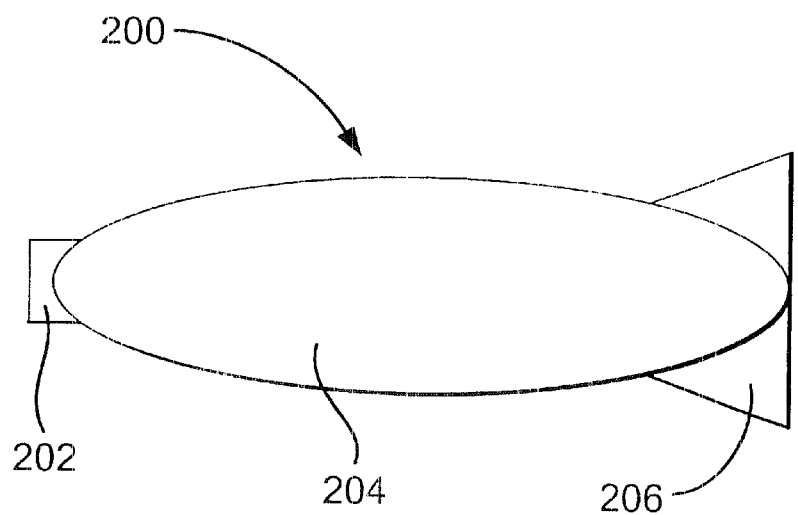
FIG. 2 shows a view of a controllable off-board unit as used in the present invention.

FIG. 2 shows a controllable off-board unit 200, which has a cable attachment point 202, an aerodynamic housing 204 and aerodynamic control surfaces 206. The control surfaces 206 allow the off-board unit 200 to maneuver autonomously, regardless of whether the off-board unit 200 is tethered or free flying. Even an off-board unit 200 with no propulsion means, for instance a unit that has been released from a tether cable, can be guided by control surfaces 206 as it glides.

When present, a tether cable 108 is attached at the cable attachment point 202. The housing 204 encloses electronic apparatus for autonomous control of the off-board unit 200 and sensor equipment. In addition, the external surface of the housing 204 and the control surfaces 206 are arranged with low radar observability in mind: the materials used and surfaces presented to enemy radar must not betray the presence of the off-board unit 200 or the host aircraft.

Figure 3:
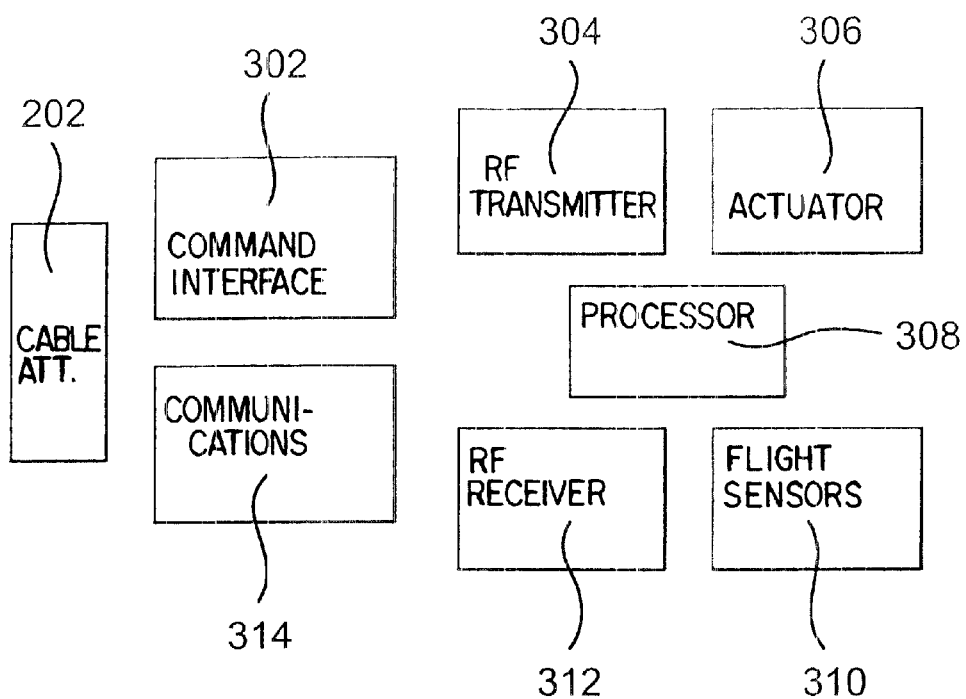
FIG. 3 shows a schematic diagram of the electronic apparatus provided in a controllable off-board unit as used in the present invention.

In FIG. 3, the tether cable 108 attached to the off-board unit 200 includes a command cable and the cable attachment point 202 includes a port for the command cable. Command signals from the host craft 102 or from other off-board units can be routed to a command interface unit 302 via the command cable. The command interface unit 302 converts command signals into instructions for processing by a processor 308 which in turn generates control instructions for an actuator unit 306. The actuator unit 306 actuates the control surfaces 206 and thereby provides the off-board unit 200 with maneuverability and flight control. The processor 308 generates the control instructions according to information from the flight sensors equipment 310. Examples of flight sensors include accelerometers, altimeters, gyroscopes and global positioning system (GPS) equipment. The off-board unit 200 also has a radio frequency transmitter unit 304 and a radio frequency receiver unit 312. The radio frequency units are used in active stealth: the radio frequency receiver unit 312 detects the presence of enemy radar and the radio frequency transmitter unit 304 generates an artificial radar profile that imitates a reflection of the enemy radar. The plurality of off-board units 200 also co-operate to provide distributed electronic warfare support measures partitioning, which means that the off-board units simultaneously provide different ESM functions thereby dividing and conquering an enemy defense system.

The off-board unit illustrated in FIG. 3 is provided with an off-board communications apparatus 314. When the off-board unit is released from its tether, communications can be maintained by the off-board communications apparatus 314. Communications can be kept relatively short-range by using only radio wavelengths that are highly attenuated over short distances, for example communications having wavelengths of the order of millimetres. Short-range communications can be both transmitted and received by the off-board communications apparatus 314.

Figure 4:
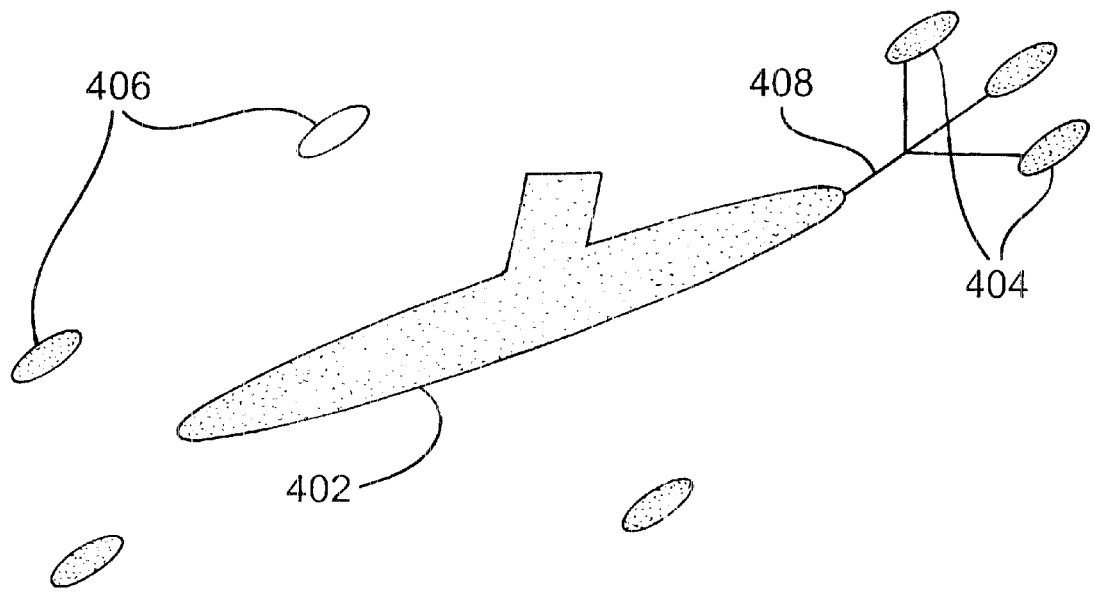
FIG. 4 shows an embodiment of the deployable off-board defensive aids system of the present invention when provided for a submarine.

In a second embodiment, the deployable off-board defensive aids system having a plurality of controllable submarine off-board units is used with a submarine as a host craft. Referring to FIG. 4, a submarine off-board defensive aids system 400 is implemented in a submarine 402 having a first group of tethered controllable off-board units 404 in tow and a second group of free-moving controllable off-board units 406. As in aircraft, both groups of controllable off-board unit are used to counter a threat or to perform an offensive mission in their own right. Each controllable off-board unit, whether tethered 404 or free 406, includes means for providing autonomous control to allow movement without entanglement with other controllable off-board units.

The controllable submarine off-board units 404, 406 manoeuvre in concert with respect to the submarine 402 and co-operate to provide the submarine 402 with active stealth facilities.

Generally, the controllable off-board units 404, 406 are stored within a pod attached to the host submarine or within an interior bay of the host submarine until they are deployed. The tethered controllable off-board units 404 are capable of being deployed and recovered as required, there being apparatus for letting out and drawing in the tether cable 408. The tethered controllable off-board units 404 can also be rapidly released from the tether cable 408, enabling them to move away from the submarine in order to seduce an offensive threat.

Whether the tether cable 408 is present or not, a given controllable off-board unit 404,406 can be provided with a propulsion mechanism as known from the art, for example propellers, thereby becoming capable of autonomous manoeuvring. Unlike the case for controllable off-board units for aircraft, a self-propelled, submarine, controllable off-board unit 406 can maintain similar velocities to the host submarine and can as easily maintain a position ahead of the host submarine in the water.

Power for equipment belonging to submarine controllable off-board units 404, 406 can be provided by batteries or in the case of tethered off-board units 404 can additionally be provided directly from the host craft along a power cable. Again, the tether cable 408 can include the power cable. Furthermore, the tether cable 408 can include a command cable.

The equipment provided in a submarine controllable off-board unit 404, 406 has many similarities to the equipment illustrated in FIG. 3. Active stealth must take into account submarine detection techniques including sonar and magnetic field profiles. For instance, each submarine off-board unit can be provided with a sonar transmitter unit and a sonar receiver unit. The sonar units can be used in active stealth: the sonar receiver unit detecting the presence of enemy sonar and the sonar transmitter unit generating an artificial sonar profile that imitates a reflection of the enemy sonar.

The external surface of the submarine off-board units is not only hydrodynamically streamlined but also arranged to minimize observability by sonar and magnetic field detection techniques. The control surfaces are naturally arranged to give maneuverability in water.

In both aircraft and submarine embodiments, the host craft can carry similar sensor and communications equipment to the equipment provided in the controllable off-board units 104, 106, 404, 406. The host craft can thereby participate in the active stealth facilities.

Figure 5:
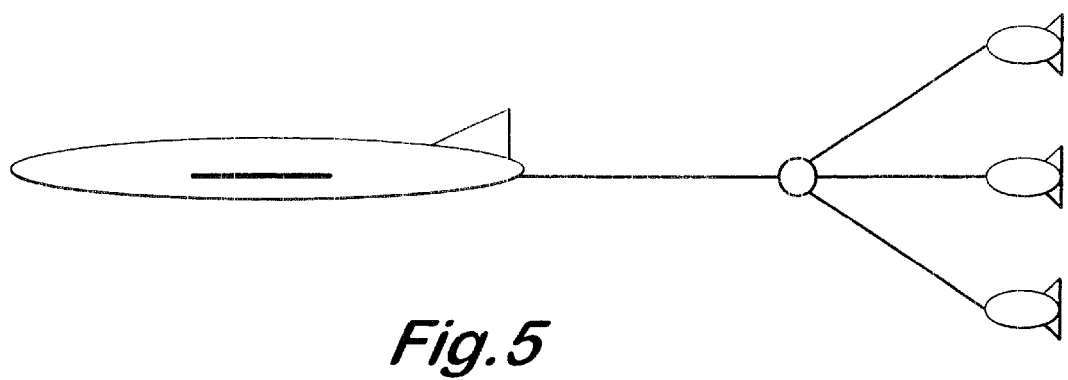
FIG. 5 shows an arrangement of tethered controllable off-board units including a tether node.
Figure 6:
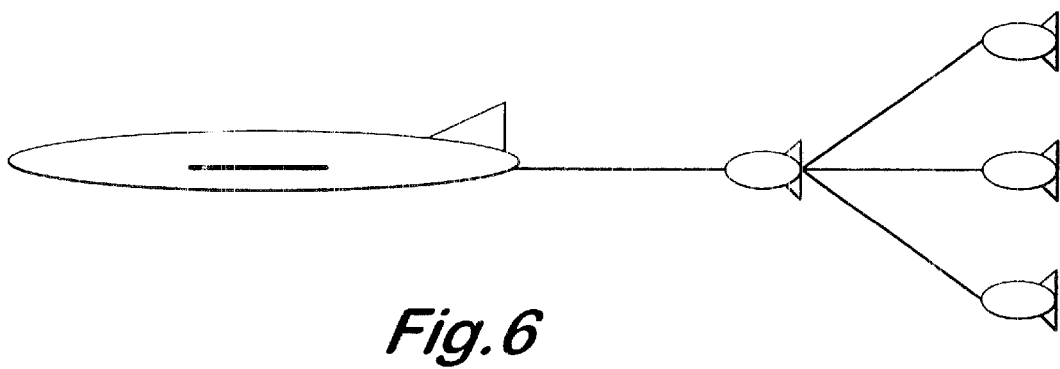
FIG. 6 shows a cascaded arrangement of tethered controllable off-board units.
Figure 7:
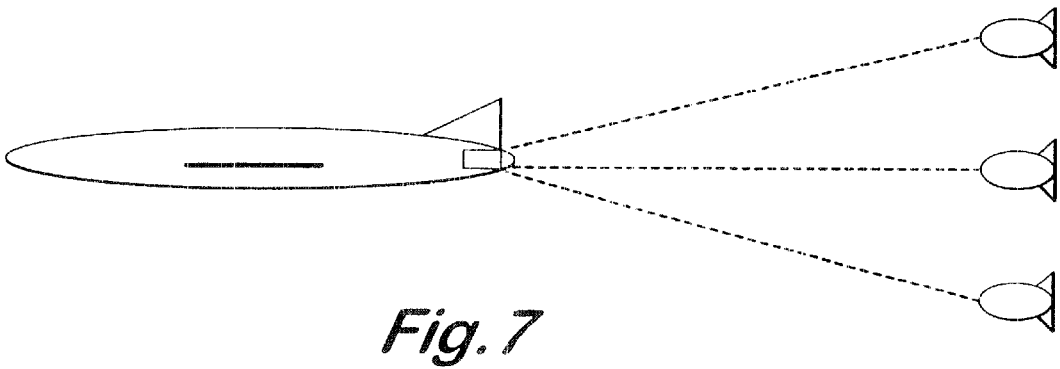
FIG. 7 shows an arrangement of controllable off-board units where all off-board units are tether-free.

Alternative arrangements of tethered controllable off-board units 104 are illustrated in FIGS. 5, 6 and 7. Although shown for aircraft, these arrangements are equally relevant to submarine applications. In FIG. 5, a single tether cable is attached at one end to the host aircraft and at the other to a tether node. The tether node in turn has further attachment points at which further tether cables are attached. A respective off-board unit is then attached to each of the further tether cables. When the tether cables include command cables, the tether node can be arranged to route commands from one off-board unit to the host aircraft and to the other off-board units.

Referring to FIG. 6, the tether node is replaced by a controllable off-board unit having further attachment points. This cascaded arrangement can be extended so that a controllable off-board unit can be attached to the host aircraft only by way of two or more intervening controllable off-board units.

FIG. 7 illustrates a situation where all the controllable off-board units are free-flying and communicate with a communications unit onboard the host aircraft over a millimetre wavelength radio link.

It will be understood that variations of the controllable off-board units can be provided with weaponry or explosives. In the event of an enemy weapon targeting the host craft, an armed controllable off-board unit can for example be deployed to either attack the enemy weapon or self-destruct in the path of an incoming missile thereby seducing the threat.

In addition, it will be understood that although the Figures described above illustrate only two dimensional formations of controllable off-board units the invention is not limited to two dimensions. Indeed three dimensional formations of controllable off-board units are essential in certain applications of the invention, for instance the provision of ESM.

The deployable off-board defensive aids system can also be arranged to provide additional services for the host craft. For aircraft, a three dimensional radar sensor system with spherical coverage can be provided which would be integrated into the controllable off-board units. For submarines, the sources of sonar pulses or magnetic field fluctuations can be located using the same equipment as the active stealth techniques.

It should be understood that although the invention has been described above as an aid for defending combat craft, the invention also has non-defence applications, including geophysical surveying, benefiting from the increased three-dimensional accuracy of the sensors and the provision of a telecommunications connections, the widely spaced off-board units providing a large array.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A deployable off-board defensive aids system for implementing active stealth facilities with respect to a host craft, the system including a plurality of controllable off-board units associated with the host craft, wherein:

each controllable off-board unit includes means for cooperation with at least the host craft;

each controllable off-board unit cooperates with at least one other controllable off-board unit.

2. A system as claimed in claim 1, wherein the plurality of controllable off-board units includes at least one tethered controllable off-board unit, which has a tether cable.

3. A system as claimed in claim 2, wherein each tethered controllable off-board unit is capable of rapid release from the tether cable.

4. A system as claimed in claim 2, wherein each tethered controllable off-board unit is deployable and recoverable using the tether cable.

5. A system as claimed in claim 2, wherein the tether cable includes power cabling.

6. A system in claim 2, wherein the tether cable includes command cabling.

7. A system as claimed in claim 2, wherein a given tethered controllable off-board unit is attached by the tether cable to a tether node that is, in turn, attached to the host craft by a further tether cable.

8. A system as claimed in claim 6, wherein the further tether cable includes command cabling and power cabling.

9. A deployable off-board defensive aids system for implementing active stealth facilities with respect to a host craft, the system including a plurality of controllable off-board units associated with the host craft, wherein:

each controllable off-board unit includes means for cooperation with at least the host craft;

the plurality of controllable off-board units includes at least one tethered controllable off-board unit, which has a tether cable;

a given tethered controllable off-board unit is attached by the tether cable to a tether node that is, in turn, attached to the host craft by a further tether cable; and the tether node can route commands carried by the command cabling from the given tethered controllable off-board unit, to other tethered controllable off-board units and to the host craft.

10. A system as claimed in claim 6, wherein the tether node is provided on a tethered controllable off-board unit that is attached in turn to the host craft by a further tether cable.

11. A system as claimed in claim 1, wherein each tethered controllable off-board unit is attached directly to the host craft by the tether cable.

12. A system as claimed in claim 1, wherein each controllable off-board unit includes a power source for supplying power to the controllable off-board unit.

13. A system as claimed in claim 1, wherein each controllable off-board unit includes a short-range communications unit and each controllable off-board unit can thereby communicate directly with at least the host craft.

14. A deployable off-board defensive aids system for implementing active stealth facilities with respect to a host craft, the system including a plurality of controllable off-board units associated with the host craft, wherein each controllable off-board unit includes means for cooperation with at least the host craft;

each controllable off-board unit includes a short-range communications unit and each controllable off-board unit can thereby communicate directly with at least the host craft; and each controllable off-board unit can use the short-range communications unit to communicate directly with at least one other controllable off-board unit.

15. A system as claimed in claim 1, wherein each controllable off-board unit has a movement control system, which autonomously controls maneuvers of said controllable off-board unit.

16. A system as claimed in claim 15, wherein the movement control system includes control surfaces and an actuator system which actuates the control surfaces according to instructions from a processing means.

17. A system as claimed in claim 1, wherein each controllable off-board unit has a propulsion device.

18. A system as claimed in claim 17, wherein the propulsion device is a propeller engine.

19. A system as claimed in claim 17, wherein the propulsion device is a jet engine.

20. A system as claimed in claim 17, wherein the propulsion device is a jet engine.

21. A system as claimed in claim 1, wherein the host craft is a combat aircraft.

22. A system as claimed in claim 21, wherein an external surface of each controllable off-board unit is arranged both to be aerodynamic and to have low radar observability.

23. A system as claimed in claim 21, wherein the active stealth facilities relate to radar.

24. A system as claimed in claim 23, wherein the system further comprises a three dimensional radar sensor with spherical coverage, said radar sensor being integrated into the controllable off-board units.

25. A system as claimed in claim 1, wherein the host craft is a submarine.

26. A system as claimed in claim 25, wherein an external surface of each controllable off-board unit is arranged both to be hydrodynamic and to have low sonar observability.

27. A system as claimed in claim 25, wherein the active stealth facilities relate to sonar.

28. A system as claimed in claim 1, wherein the active stealth facilities include electronic warfare support measures.

29. A system as claimed in claim 1, wherein the active stealth facilities include jamming.

30. A system as claimed in claim 1, wherein:

each controllable off-board unit has an active stealth transmitter device and an active stealth receiver device;

the active stealth receiver device detects impinging detection pulses; and the active stealth transmitter device transmits an artificial profile.

31. A system as claimed in claim 1, wherein the electronic components of the plurality of controllable off-board units use commercially available components.

* * * * *